(12) United States Patent
Jo

(10) Patent No.: US 6,801,294 B2
(45) Date of Patent: Oct. 5, 2004

(54) RECORDING AND/OR REPRODUCING APPARATUS AND METHOD USING KEY FRAME

(75) Inventor: Jae-moon Jo, Seongnam (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 10/300,874

(22) Filed: Nov. 21, 2002

(65) Prior Publication Data

US 2003/0071971 A1 Apr. 17, 2003

Related U.S. Application Data

(63) Continuation-in-part of application No. 09/691,123, filed on Oct. 19, 2000, now abandoned.

(30) Foreign Application Priority Data

Oct. 19, 1999 (KR) .......................................... 1999-45297

(51) Int. Cl.[7] ............................ G03B 19/18; H04N 9/64
(52) U.S. Cl. ........................... 352/44; 348/700; 345/723
(58) Field of Search ................................. 348/700, 702; 345/723; 352/38, 44

(56) References Cited

U.S. PATENT DOCUMENTS

| | | | | |
|---|---|---|---|---|
| 5,083,860 A | * | 1/1992 | Miyatake et al. | 352/129 |
| 5,099,322 A | * | 3/1992 | Gove | 348/700 |
| 5,521,841 A | * | 5/1996 | Arman et al. | 345/723 |
| 5,537,530 A | * | 7/1996 | Edgar et al. | 345/723 |
| 5,642,174 A | * | 6/1997 | Kazui et al. | 348/700 |
| 6,014,183 A | * | 1/2000 | Hoang | 348/702 |
| 6,125,229 A | * | 9/2000 | Dimitrova et al. | 386/69 |
| 6,157,744 A | * | 12/2000 | Nagasaka et al. | 382/236 |
| 6,192,183 B1 | * | 2/2001 | Taniguchi et al. | 386/52 |

FOREIGN PATENT DOCUMENTS

| | | |
|---|---|---|
| CA | 2095754 | 2/1994 |
| EP | 0 675 495 A2 | 10/1995 |
| EP | 0 810794 A2 | 12/1997 |
| EP | 0 841 665 A2 | 5/1998 |
| GB | 2 322 225 | 8/1998 |
| JP | 6-217254 | 8/1994 |
| JP | 8-214253 | 8/1996 |
| JP | 9-73761 | 3/1997 |
| WO | WO 94/11995 | 5/1994 |
| WO | WO 98/55942 | 12/1998 |

* cited by examiner

Primary Examiner—Rodney Fuller
Assistant Examiner—Arthur A Smith
(74) Attorney, Agent, or Firm—Sughrue Mion, PLLC

(57) ABSTRACT

There is provided an apparatus for recording and/or reproducing a moving picture using key frames by which the overall scenario of moving picture contents can be ascertained during a trick-play mode, and a method thereof. The recording apparatus includes a recording medium and recording apparatus for marking a representative picture position detected when there is a scene change among coded moving picture data streams, and recording the moving picture data streams on the recording medium. The scene change is determined based on distribution characteristics of macro blocks of frame units for the input coded moving picture data streams. The moving picture reproducing apparatus includes a recording medium having coded moving picture streams and a representative picture position detected when there is a scene change recorded thereon, and reproducing apparatus for searching for the representative picture position recorded on the recording medium and then reproducing a representative picture.

15 Claims, 3 Drawing Sheets

RECORDING AND/OR REPRODUCING APPARATUS AND METHOD USING KEY FRAME

This application is a continuation-in-part application of U.S. application Ser. No. 09/691,123, filed Oct. 19, 2000, now abandoned, the contents of which is incorporated herein by reference.

BACKGROUND OF THE INVENTION

1. Field of the Invention

The present invention relates to a recording and/or reproducing apparatus and method using a key frame, and more particularly, to an apparatus and method for recording and/or reproducing a moving picture using key frames by which the overall scenario of moving picture contents can be ascertained during a trick-play mode.

2. Description of the Related Art

In related art moving picture recording method, moving picture data streams are recorded on a recording medium as they are, and in existing moving picture reproduction methods, the recorded moving picture data streams are reproduced at a normal speed or at a higher speed according to a given reproduction speed factor. During a normal speed reproduction mode, reproduction is performed at a normal speed. During a high-speed reproduction mode, reproduction is performed at a speed of 2 times, 4 times or 6 times the normal speed.

While conventional moving picture reproduction methods are performed at a fixed speed selected from predetermined reproduction speed factors, the same situation is encountered during a high-speed reproduction mode, such as a trick-play mode. In other words, in a trick-play mode, reproduction is performed at a speed selected from 2 times normal speed, 4 times normal speed or 6 times normal speed.

However, the aforementioned related art has various problems and disadvantages. For example, but not by way of limitation, it is difficult to reproduce only the key frame corresponding to a user's desired representative picture when using the conventional moving picture reproduction method. Accordingly, it is quite difficult for a user to accurately detect and reproduce a desired scene (e.g., the title of a movie) from moving pictures reproduced at a high speed, like in a trick-play mode.

To overcome the above-described problem, there has been proposed a related art method in which, while watching moving picture contents, a user directly marks every desired scene to be reproduced and the marked scenes are used as key frames during reproduction. However, according to this related art method, the user must mark every desired scene manually while watching moving picture contents. As marking is done manually, it is not easy to accurately mark only key frames representing the overall scenario of moving pictures occurring in real-time. Further, the related art does not provide for automatic marking of the key frames.

SUMMARY OF THE INVENTION

To solve the above problems, it is a feature of the present invention to provide a recording apparatus for automatically determining positions of representative contents by which the overall scenario can be estimated, from input data streams.

It is another feature of the present invention to provide a reproducing apparatus for automatically searching for the position of a representative content recorded by the recording apparatus and reproducing the same.

It is still another feature of the present invention to provide a moving picture recording apparatus for automatically determining positions of representative contents by which the overall scenario can be estimated, from input moving picture data streams.

It is a further feature of the present invention to provide a moving picture reproducing apparatus for automatically searching for the position of a representative content recorded by the moving picture recording apparatus and reproducing the same.

It is a another feature of the present invention to provide a moving picture recording and/or reproducing method of automatically recording the position of a representative picture by which the overall scenario can be estimated from input moving picture data streams, and reproducing only the recorded representative picture.

In an aspect of the present invention, there is provided a recording apparatus including input means for inputting coded data streams, a recording medium on which data streams are recorded, and recording means for detecting representative contents when it is determined that there is a change in contents of the coded data streams, and recording the input coded data streams on the recording medium while marking the position of the detected representative contents, the change in contents being determined based on distribution characteristics of macro blocks of frame units for the input coded data streams.

The recording means preferably detects a subsequent intra frame after it is determined that there is a change in contents, as representative contents.

In another aspect of the present invention, there is provided a moving picture recording apparatus including input means for inputting coded data streams, a recording medium, and recording means for detecting a representative picture when it is determined that there is a scene change of the coded moving picture data streams, and recording the input coded moving picture data streams on the recording medium while marking the position of the detected representative picture, the scene change being determined based on distribution characteristics of macro blocks of frame units for the input coded moving picture data streams.

The recording means preferably includes a key frame detection and mark unit for detecting the position of a key frame corresponding to the representative picture among the moving picture data streams and marking the position thereof, and a recording processor for recording the moving picture data stream having the representative picture position marked therein on the recording medium.

The key frame detection and mark unit preferably detects a subsequent intra frame after it is determined that there is a scene change, as the key frame, the key frame detection and mark unit preferably determines that there is a scene change when the distribution degree of the intra macro blocks of the frame unit is out of a normal tolerance in view of a sequence of frames compatible with coding standards of the coded moving picture data streams.

The position data of the representative picture is preferably recorded either separately from or together with the coded moving picture data streams.

In another aspect of the present invention, there is provided a reproducing apparatus including a recording medium having coded data streams and position data of representative contents detected according to a change in contents of the coded data streams, recorded thereon, the position of the representative contents being determined based on distribution characteristics of macro blocks of frame units of the coded data streams, and reproducing means for searching for the position data of representative contents recorded on the recording medium and reproducing the representative contents.

In a further aspect of the present invention, there is provided a moving picture reproducing apparatus including a recording medium having coded moving picture data streams and position data of a representative picture detected when there is a scene change of the coded moving picture data streams, recorded thereon, the position of the representative picture being determined based on distribution characteristics of macro blocks of frame units of the coded moving picture data streams, and reproducing means for searching for the position data of a representative picture recorded on the recording medium and reproducing the representative picture.

The reproducing means includes a key frame position search unit for searching for the position data of the key frame corresponding to the representative picture among the moving picture data streams recorded on the recording medium, and a reproduction processor for reading out the moving picture data steam corresponding to the key frame while skipping all unmarked frames between key frames, by using the key frame position data found by the key frame position search unit, and restoring the read data stream into uncoded original picture data. The key frame is preferably an intra frame generated after the scene change occurs.

In another aspect of the present invention, there is provided a recording method including the steps of (a) if coded data streams are applied, detecting whether there is a change in contents based on distribution characteristics of macro blocks of frame units, (b) detecting a subsequent intra frame after it is determined that there is a change in contents, as representative contents, (c) marking the position of the detected representative contents, and (d) recording the coded data streams marked with the position of the detected representative contents.

The step of detecting whether there is a change in contents is preferably performed based on distribution characteristics of intra (I) macro blocks of frame units and the sequence of frames.

In still another aspect of the present invention, there is provided a moving picture recording method including the steps of (a) if coded moving picture data streams are applied, detecting whether there is a scene change based on the sequence of frames based on coding standards and the distribution degree of macro blocks of frame units, (b) if there is a scene change, detecting a subsequent intra frame after it is detected that there is a scene change, as a representative picture, (c) marking the position of the detected representative picture, and (d) recording the coded moving picture data streams marked with the position of the detected representative pictures.

In step (a), if the coding standards are MPEG standards, the frames of the coded moving picture data streams are divided into I frames, B frames and P frames and the scene change is preferably detected based on distribution characteristics of intra macro blocks in units of frames.

In still another aspect of the present invention, there is provided a reproducing method for reproducing data from a recording medium having coded data streams marked with the positions of representative contents, from which a scenario can be estimated, the method including the steps of (a) if a trick-play mode is set, searching for the position data of the representative contents recorded on the recording medium, (b) while controlling the reproduction position of the recording medium based on the position data of the representative contents found in step (a), reading the data stream recorded on the recording medium, and (c) restoring the data stream read in step (b) into uncoded original picture data.

According to a further aspect of the present invention, there is provided a moving picture reproducing method for reproducing a moving picture from a recording medium on which coded moving picture data streams having a representative picture position marked therein according to a scene change are recorded, the method including the steps of (a) if a trick-play mode is set, searching for the representative picture position recorded on the recording medium, (b) while controlling the reproduction position of the recording medium based on the position data of the representative picture found in the step (a), reading the moving picture data stream recorded on the recording medium, and (c) restoring the moving picture data stream read in step (b) into uncoded original picture data.

The moving picture reproducing method may further include the step of displaying the uncoded original picture data at a high speed, or displaying the uncoded original picture data at a normal speed.

BRIEF DESCRIPTION OF THE DRAWINGS

The above aspects and advantages of the present invention will become more apparent by describing in detail a preferred embodiment thereof with reference to the attached drawings in which.

DETAILED DESCRIPTION OF THE INVENTION

The present invention will now be described in detail with reference to the accompanying drawings.

Figure 1:
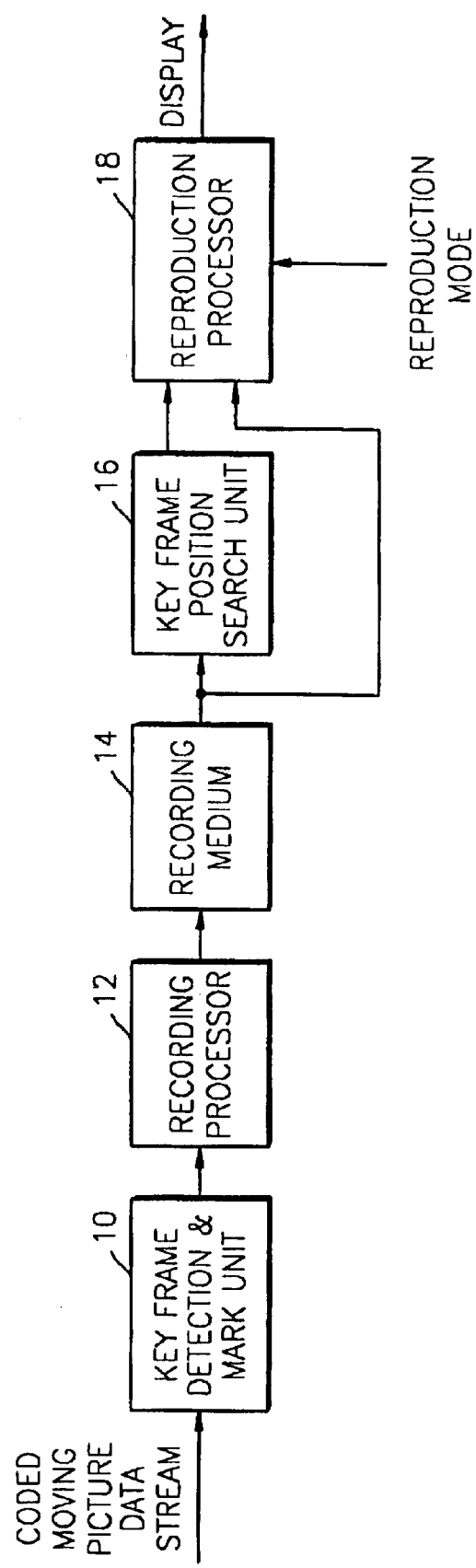
FIG. 1 is a functional block diagram illustrating a moving picture recording and/or reproducing apparatus using a key frame according to the present invention.

Referring to FIG. 1, a moving picture recording and/or reproducing apparatus according to the present invention includes a key frame detection and mark unit 10, a recording processor 12, a recording medium 14, a key frame position search unit 16, and a reproduction processor 18. The key frame detection and mark unit 10 and the recording processor 12 correspond to moving picture recording means. The key frame position search unit 16 and the reproduction processor 18 correspond to moving picture reproducing means.

The key frame detection and mark unit 10 detects whether or not there is a scene change when coded moving picture data streams are input, based on the coding standards of the input moving picture data streams, and detects the position of a key frame corresponding to a representative picture if there is a scene change. Then, the key frame detection and mark unit 10 marks the position of the detected key frame. The coded moving picture data streams are received from a predetermined broadcasting channel or supplied from an external system.

For example, but not by way of limitation, when the input moving picture data streams are coded based on MPEG coding standards, when a period pattern of intra-frames of input moving picture data streams is out of a normal tolerance for an intra-frame period pattern compatible with the MPEG coding standards, the key frame detection and mark unit determines that there is a scene change.

In other words, in MPEG 2, frames are generated in the order of I, B, B, P, B, B, P, . . . , I, B, B, P, . . . , where "I" represents intra-frames, "B" represents bi-directional frames, and "P" represents prediction frames. Here, an I (Intra) frame is generally generated every 15 frames (i.e., 0.5 seconds). When there is a scene change in moving picture data streams coded in accordance with the MPEG 2 standard, if the corresponding frame is a B (Bidirectional) or P (Prediction) frame, the number of intra (I) macro blocks distributed in the B or P frame increases. As a result, a scene change produces many macro blocks without reference to previous reference frames.

However, even if the distribution degree of intra (I) macro blocks increases, the B or P frame is not characterized as an I frame. This is because even if there is a scene change, some macro blocks in current reference frames search for reference macro blocks from previous reference frames to generate motion vectors.

For example, but not by way of limitation, when colors in some areas of the previous reference frame are substantially the same with respect to each other, (even if there is a scene change), the previous reference frames are detected as reference macro blocks so that they are coded into B macro blocks in B frames and P macro blocks in P frames. As described above, if there is a scene change in a B or P frame so as to increase the distribution degree of I macro blocks, the period of the intra frame is considered to be out of a normal tolerance compatible with the MPEG coding standard, as is known in the MPEG 2 coding technology.

After it is determined that there has been a scene change in coded moving picture data streams input based on the above-described standards, the intra-frame occurring for the first time is detected as a key frame corresponding to a representative picture. Also, to indicate that the detected intra-frame is a key frame, the position of the detected intra-frame is marked.

The recording processor 12 records the moving picture data stream having the representative picture position marked therein and the position of a scene representing a scene change on the recording medium 14. Here, the position data of the key frame may be recorded in a separate area of the recording medium 14 or may be recorded together with the moving picture data streams.

The moving picture reproducing means, including the key frame position search unit 16 and the reproduction processor 18, searches for the position data of a representative picture recorded on the recording medium 14 and reproduces only the representative picture. In other words, the key frame position search unit 16 searches for the position data of the key frame recorded in a separate area of the recording medium 14 or recorded with the moving picture data stream.

When the current reproduction mode is a trick-play mode (or fast forward play mode) for appreciating the overall scenario, by using the key frame position data found by the key frame position search unit 16, the reproduction processor 18 reads out only the moving picture data stream corresponding to the key frame while jumping the reproduction position of the recording medium 14, and restores the read data stream into the uncoded original picture data, to then be displayed on a screen.

Therefore, in an exemplary, non-limiting moving picture recording and/or reproducing apparatus according to the present invention, a user can conveniently ascertain the overall scenario of the moving picture contents reproduced at a high speed and can switch the high-speed reproduction mode to a normal reproduction mode when a user's desired scene appears. Thus, since the detailed moving pictures of the desired scene can be appreciated, the user's satisfaction with the reproduction mode can be enhanced, as a benefit of the present invention.

Figure 2:
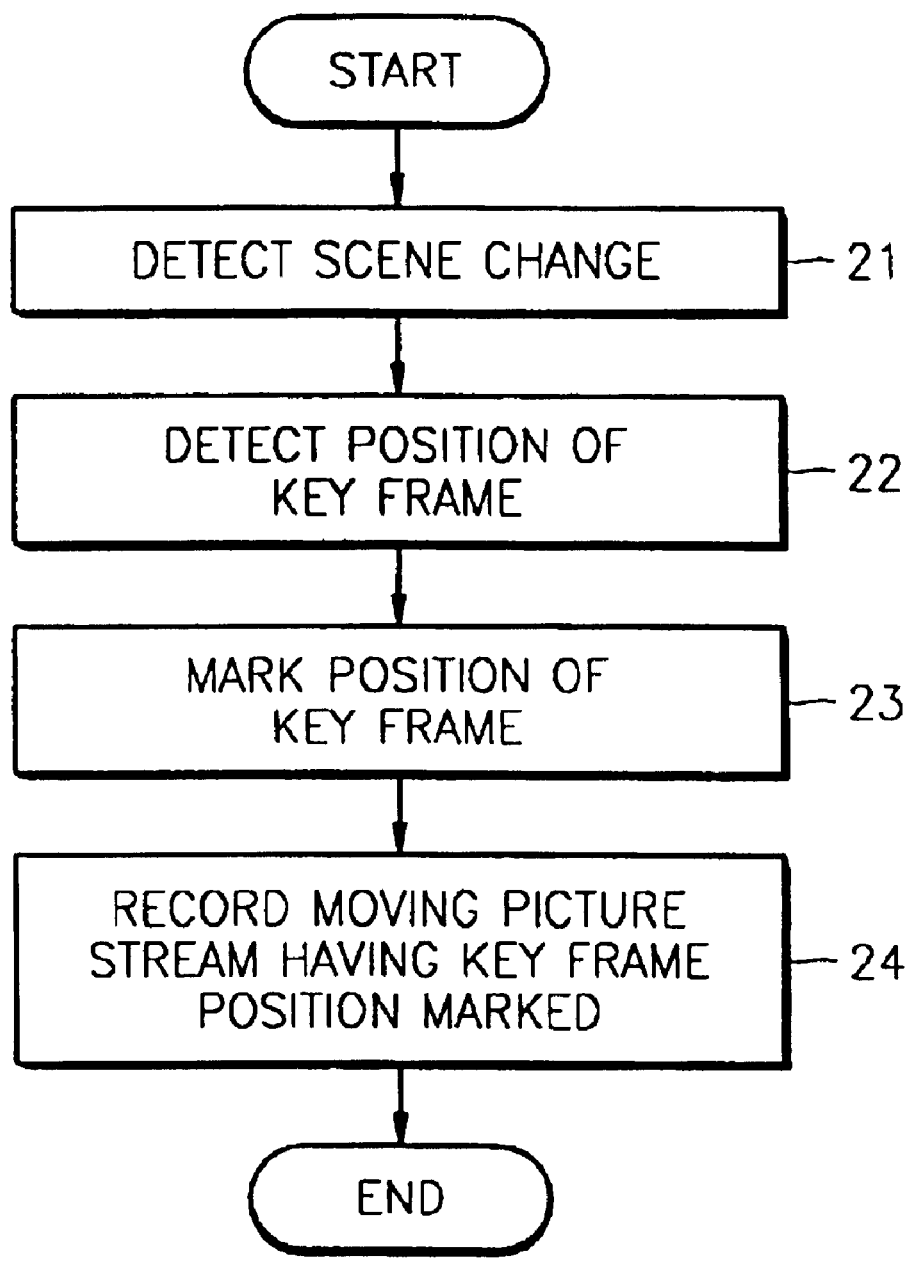
FIG. 2 is an operational flow chart illustrating a moving picture recording method using a key frame according to the present invention.

FIG. 2 is an operational flow chart of a moving picture recording method using a key frame according to the present invention.

If the coded moving picture data streams are applied, as shown in FIG. 1, in step 21, it is detected whether there is a scene change. In step 22, the position of an intra-frame occurring for the first time after the scene change is detected as the position of the key frame corresponding to a representative picture. In step 23, the detected key frame position is marked to indicate that it is the position of the representative picture. In step 24, the moving picture data stream having the position of the key frame corresponding to the representative picture marked therein is recorded on the recording medium 14.

Figure 3:
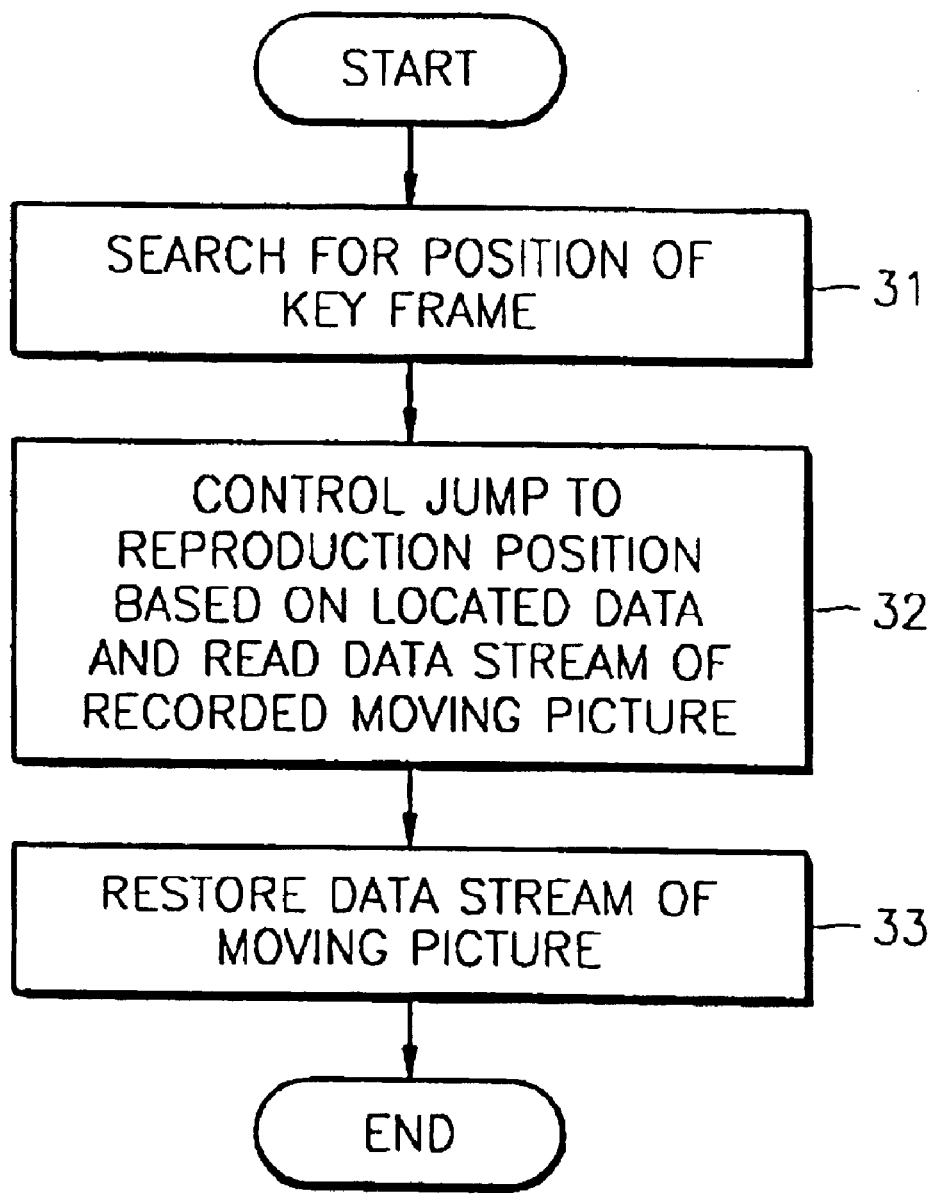
FIG. 3 is an operational flow chart illustrating a moving picture reproducing method using a key frame according to the present invention.

FIG. 3 is an operational flow chart of a moving picture reproducing method using a key frame according to the present invention.

If a trick-play mode for appreciating the overall scenario of moving picture contents is set, the position of a key frame corresponding to a representative picture is searched for from the recording medium 14 in step 31. In step 32, while skipping all unmarked frames between key frames, by using the key frame position data found in step 31, the recorded moving picture data streams are read out. In step 33, the read moving picture data streams are restored into the uncoded original picture data, thereby allowing a user to watch the restored picture data.

In the foregoing embodiments, the invention has been described by representing moving picture data streams. It is, however, possible to represent data streams with a scenario. In this case, the scene change corresponds to a change in contents of the data streams, and the representative picture is defined as representative contents (i.e., key frames). Thus, the overall scenario recorded based on the representative contents can be predicted.

As described above, according to the present invention, when coded data streams are recorded, a key frame representing a change contents is automatically detected and the position thereof is recorded. During a trick-play mode, the recorded key frame position is searched for, and only the data stream corresponding to the key frame is reproduced, thereby easily ascertaining the overall scenario of the recorded contents without manipulation by a user.

Also, according to the present invention, when coded moving picture data streams are recorded, a key frame representing a scene change is automatically detected and the position thereof is recorded. During a trick-play mode, the recorded key frame position is searched for, and only the moving picture data stream corresponding to the key frame is reproduced at a high speed, thereby easily ascertaining the overall scenario of moving picture contents without requiring manipulation by a user.

Since appreciation of the overall scenario is allowed, a user can switch the reproduction mode to a normal reproduction mode when a user's desired scene appears in the course of watching the overall scenario, thereby easily accessing the user's desired contents among moving picture data streams.

It will be apparent to those skilled in the art from the foregoing that, while particular forms of the invention have been illustrated and described, various modifications can be made without departing from the spirit and scope of the invention. Accordingly, it is not intended that the invention be limited, except as by the appended claims.

What is claimed is:

1. A recording apparatus comprising:

input means for inputting coded data streams;

a recording medium on which said coded data streams are recorded; and recording means for (a) detecting representative contents when there is a change in contents of the coded data streams, and (b) recording the input coded data streams on the recording medium while marking the position of the detected representative contents, wherein the change in the contents is determined based on distribution characteristics of macro blocks of frame units for the input coded data streams.

2. The recording apparatus according to claim 1, wherein the recording means detects a subsequent intra frame after it is determined that there is a change in contents, as representative contents.

3. A moving picture recording apparatus comprising:

input means for inputting moving picture coded data streams;

a recording medium; and recording means for (a) detecting a representative picture when there is a scene change of the coded moving picture data streams, and (b) recording the input coded moving picture data streams on the recording medium while marking the position of the detected representative picture, wherein the scene change is determined based on distribution characteristics of macro blocks of frame units for the input coded moving picture data streams.

4. The moving picture recording apparatus according to claim 3, wherein the recording means comprises:

a key frame detection and mark unit for detecting a position of a key frame corresponding to the representative picture among the moving picture data streams, and marking the position thereof; and a recording processor for recording the moving picture data stream having the marked representative picture position on the recording medium.

5. The moving picture recording apparatus according to claim 4, wherein the key frame detection and mark unit detects a subsequent intra frame after it is determined that there is a scene change, as the key frame.

6. The moving picture recording apparatus accprding to claim 5, wherein the key frame detection and mark unit determines that there is a scene change if the distribution degree of the intra macro blocks of the frame unit is out of a normal tolerance in view of the sequence of frames of moving picture data streams coded based on coding standards.

7. The moving picture recording apparatus according to claim 3, wherein the position data of the representative picture is recorded one of separately from and together with the coded moving picture data streams.

8. A moving picture reproducing apparatus comprising:

a recording medium having coded moving picture data streams and position data of a representative picture detected when there is a scene change of the coded moving picture data streams recorded thereon, the position of the representative picture being determined based on distribution characteristics of macro blocks of frame units of the coded moving picture data streams; and reproducing means for searching for the position data of the representative picture recorded on the recording medium, and then reproducing the representative picture, wherein the reproducing means includes a key frame position search unit for searching for the position data of the key frame corresponding to the representative picture among the moving picture data streams recorded on the recording medium, and a reproduction processor for reading out the moving picture data steam corresponding to the key frame while skipping all unmarked frames between key frames, by using the key frame position data found by the key frame position search unit, and restoring the read data stream into uncoded original picture data, and wherein the key frame is an intra frame generated after the scene change occurs.

9. A recording method comprising the steps of:

(a) if coded data streams are applied, detecting whether there is a change in contents based on distribution characteristics of macro blocks of frame units;

(b) detecting a subsequent intra frame after it is determined that there is a change in contents, as representative contents;

(c) marking a position of the detected representative contents; and (d) recording the coded data streams marked with the position of the detected representative contents.

10. The recording method according to claim 9, wherein the step (a) is performed based on distribution characteristics of intra (I) macro blocks of frame units and the sequence of frames.

11. A moving picture recording method comprising the steps of:

(a) if coded moving picture data streams are applied, detecting whether there is a scene change based on a sequence of frames based on coding standards and a distribution degree of macro blocks of frame units;

(b) if there is a scene change, detecting a subsequent intra frame after it is detected that there is a scene change, as a representative picture;

(c) marking the position of the detected representative picture; and (d) recording the coded moving picture data streams marked with the position of the detected representative pictures.

12. The moving picture recording method according to claim 11, wherein in step (a), if the coding standards are MPEG standards, the frames of the coded moving picture data streams are divided into I frames, B frames and P frames and the scene change is preferably detected based on distribution characteristics of intra macro blocks in units of frames.

13. A moving picture reproducing method for reproducing a moving picture from a recording medium on which coded moving picture data streams having a representative picture position marked therein according to a scene change are recorded, the method comprising the steps of:

(a) if a trick-play mode is set, searching for the representative picture position recorded on the recording medium;

(b) while controlling the reproduction position of the recording medium based on the position data of the representative picture found in the step (a), reading the moving picture data stream recorded on the recording medium; and (c) restoring the moving picture data stream read in step (b) into uncoded original picture data, wherein the representative picture is an intra frame generated after it is determined that there is a scene change.

14. The moving picture reproducing method according to claim 13, further comprising the step of (d) displaying the uncoded original picture data at a high speed.

15. The moving picture reproducing method according to claim 13, further comprising the step of (d) displaying the uncoded original picture data at a normal speed.

* * * * *